United States Patent
Huo et al.

(10) Patent No.: US 10,771,123 B2
(45) Date of Patent: Sep. 8, 2020

(54) DISTRIBUTED PHASED ARRAYS BASED MIMO (DPA-MIMO) FOR NEXT GENERATION WIRELESS USER EQUIPMENT HARDWARE DESIGN AND METHOD

(71) Applicants: Yiming Huo, Victoria (CA); Xiaodai Dong, Victoria (CA); Wei Xu, Nanjing (CN)

(72) Inventors: Yiming Huo, Victoria (CA); Xiaodai Dong, Victoria (CA); Wei Xu, Nanjing (CN)

( * ) Notice: Subject to any disclaimer, the term of this patent is extended or adjusted under 35 U.S.C. 154(b) by 0 days.

(21) Appl. No.: 15/883,725

(22) Filed: Jan. 30, 2018

(65) Prior Publication Data

US 2018/0219587 A1 Aug. 2, 2018

Related U.S. Application Data

(60) Provisional application No. 62/453,120, filed on Feb. 1, 2017.

(51) Int. Cl.
*H04B 7/04* (2017.01)
*H04B 7/0426* (2017.01)
(Continued)

(52) U.S. Cl.
CPC .............. *H04B 7/043* (2013.01); *H01Q 5/25* (2015.01); *H01Q 21/065* (2013.01);
(Continued)

(58) Field of Classification Search
CPC ........ H04B 7/043; H04B 1/0071; H04B 1/40; H04B 7/024; H04B 7/0413; H04B 7/0495;
(Continued)

(56) References Cited

U.S. PATENT DOCUMENTS

| | | | |
|---|---|---|---|
| 9,819,083 B1* | 11/2017 | Chen ..................... | H01Q 3/40 |
| 2013/0095770 A1* | 4/2013 | Moshfeghi ............ | H04B 7/043 |
| | | | 455/73 |

(Continued)

*Primary Examiner* — Michael R Neff
(74) *Attorney, Agent, or Firm* — Womble Bond Dickinson (US) LLP

(57) ABSTRACT

Generally, this disclosure provides systems and methods for distributed phased array multiple input multiple output (DPA-MIMO) communications. A system may comprise
  a baseband processing unit;
  a plurality of beamforming (BF) modules each of which comprises at least a beamforming antenna and a transceiver circuit comprising at least a downconverter that downconverts a beamformed antenna radio frequency signal to an intermediate frequency signal, and an upconverter that upconverts an intermediate frequency signal to radio frequency and sends to said beamforming antenna for transmission;
  a plurality of intermediate frequency (IF) radios, each of which comprises a receive chain circuit that includes at least a downconverter that downconverts an intermediate frequency signal sent from said BF module to a basedband signal conveyed to said baseband processing unit, and a transmit chain circuit that includes at least an upconverter that upconverts a baseband signal received from said baseband processing unit to an intermediate frequency signal which is conveyed to said beamforming module;
  and
  a plurality of cables or any type of physical signal transmission medium, each of which connects one of said beamforming modules with one of said intermediate frequency radios.

24 Claims, 10 Drawing Sheets

(51) Int. Cl.
| | |
|---|---|
| *H04B 1/00* | (2006.01) |
| *H04L 1/06* | (2006.01) |
| *H01Q 5/25* | (2015.01) |
| *H01Q 21/06* | (2006.01) |
| *H01Q 21/30* | (2006.01) |
| *H04B 7/024* | (2017.01) |
| *H04B 7/0413* | (2017.01) |
| *H04B 1/40* | (2015.01) |
| *H04B 7/0495* | (2017.01) |
| *H01Q 1/24* | (2006.01) |
| *H01Q 1/22* | (2006.01) |

(52) U.S. Cl.
CPC ........... *H01Q 21/30* (2013.01); *H04B 1/0071* (2013.01); *H04B 1/40* (2013.01); *H04B 7/024* (2013.01); *H04B 7/0413* (2013.01); *H04L 1/0625* (2013.01); *H01Q 1/2283* (2013.01); *H01Q 1/243* (2013.01); *H01Q 1/246* (2013.01); *H04B 7/0495* (2013.01)

(58) Field of Classification Search
CPC ........ H01Q 5/25; H01Q 21/065; H01Q 21/30; H01Q 1/2283; H01Q 1/243; H01Q 1/246; H04L 1/0625
USPC .......................................................... 375/262
See application file for complete search history.

(56) References Cited

U.S. PATENT DOCUMENTS

| | | | |
|---|---|---|---|
| 2017/0041038 A1* | 2/2017 | Kirkpatrick | G01S 13/02 |
| 2017/0054534 A1* | 2/2017 | Sang | H04L 5/005 |
| 2017/0331670 A1* | 11/2017 | Parkvall | H04W 52/0245 |

* cited by examiner

DISTRIBUTED PHASED ARRAYS BASED MIMO (DPA-MIMO) FOR NEXT GENERATION WIRELESS USER EQUIPMENT HARDWARE DESIGN AND METHOD

CROSS-REFERENCE TO RELATED APPLICATIONS

The present Utility patent application claims priority benefit of the U.S. provisional application for patent Ser. No. 62/453,120, titled "Distributed Phased Arrays Based MIMO (DPA-MIMO) for Next Generation Wireless User Equipment Hardware Design and Method", filed on Feb. 1, 2017, under 35 U.S.C. 119(e). The contents of this related provisional application are incorporated herein by reference for all purposes to the extent that such subject matter is not inconsistent herewith or limiting hereof.

RELATED CO-PENDING US. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

FIELD OF THE INVENTION

One or more embodiments of the invention generally relate to mobile wireless communications. More particularly, the invention relates to multiple-input-multiple-output wireless communications device designs.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Current mobile computing devices such as, but not limited to, smartphones typically contain more wireless technologies and standards as time progresses. Support for more wireless technologies and standards may be typically achieved by additional hardware systems. Considerations are typically given for power, cost, and/or physical space when designing mobile computing devices for users Typically, current wireless communication systems require higher data rates to enable increasingly complex applications. Wireless communication systems may involve communications at frequencies as high as 60 GHz. Communications at high frequencies may allow for more available spectrums and bandwidths, but may lead to high propagation loss and penetration loss. Spectral efficiency may be improved by multiple-input-multiple-output (MIMO) techniques.

Fifth generation wireless communication systems such as 5G typically are expected to have peak data throughputs of approximately 10 gigabits per second. Higher data throughputs typically may be achieved by using a broader frequency range, improving data encoding and/or error correction, and/or improving signal reception. Higher frequencies such as those above 37 GHz are typically known to have a higher degree of signal interference from physical objects such as, but not limited to, buildings and/or people, compared to typically more traditional cellular frequencies. Improvements in data encoding and/or error correction typically require considerations for hardware costs and/or power usage. Signal reception may typically be improved with additional hardware components such as, but not limited to, antennas and/or amplifiers and typically require considerations such as, but not limited to, hardware cost, power usage, and/or physical dimensions.

The following is an example of a specific aspect in the prior art that, while expected to be helpful to further educate the reader as to additional aspects of the prior art, is not to be construed as limited the present invention, or any embodiments thereof, to anything stated or implied therein or inferred thereupon. By way of educational background, another aspect of the prior art generally useful to be aware of is that some companies may implement wireless communication designs that comprise of a plurality of antennas to improve signal reception of a predetermined frequency range.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF SOME EMBODIMENTS

Some embodiments of the present invention and variations thereof, relate to wireless communications systems. Some of these embodiments may comprise computer software. In some of these embodiments, software may be integrated into hardware, including, without limitation, uniquely-designed hardware for running embodiment software.

Figure 1:
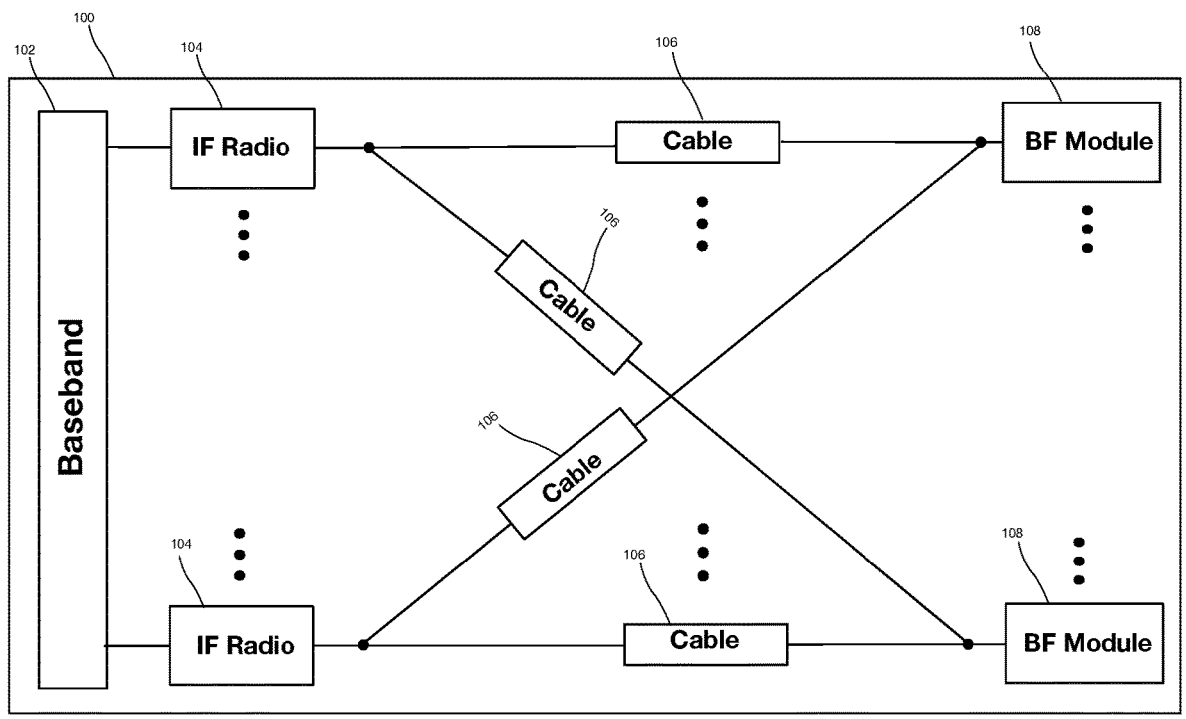
FIG. 1 illustrates a top level system diagram of a distributed phased array multiple-input-multiple-output wireless communication architecture, in accordance with an embodiment of the present invention.

FIG. 1 illustrates a top level system diagram of a distributed phased array multiple-input-multiple-output (DPA-MIMO) wireless communication architecture, in accordance with an embodiment of the present invention. A DPA-MIMO wireless communication architecture 100 comprises of a baseband processing unit 102, one or more intermediate frequency (IF) radios 104, one or more cables 106, and one or more beamforming (BF) modules 108. Baseband processing unit 102 may handle all baseband signals for all IF radios 104. Electronic signals and/or power may travel from IF radios 104 through one or more cables 106 to one or more BF modules 108. BF module 106 may be configured to receive and/or transmit wireless data.

During a typical receive operation, henceforth also known as a downlink path, BF module 108 receives wireless signals and downconverts the wireless signals to an intermediate frequency (IF) range. One or more BF modules 108 may form wireless receiving beams independently or jointly pointing to any directions with any beamwidths that are amenable to reception in a given propagation environment. The wireless signals in the IF range are sent through one or more cables 106 to one or more IF radios 104. At IF radio 104, IF range wireless signals are further downconverted in the frequency domain and sent to baseband processing unit 102 for processing.

During a typical transmit operation, henceforth also known as an uplink path, baseband processing unit 102 generates baseband data carrying information for communication and sends the baseband signals to one or more IF radios 104. IF radios 104 upconvert the baseband signals to one or more intermediate frequencies which are sent through one or more cables 106 to one or more BF modules 108. BF modules 108 upconvert any received IF signals to one or more predetermined transmission frequencies. One or more BF modules 108 further form a wireless transmission beams independently or jointly pointing to any directions with any beamwidths that are amenable to transmission in a given propagation environment and sends wireless signals at transmission frequencies.

One or more IF radios 104 may be connected to one BF module 108 through one or more cables 106. BF module 108 may exchange signals with a plurality of IF radios 104, which may be performed during instances when, but not limited to, some of the BF modules are powered down or stand by.

It may be appreciated by a person with ordinary skill in the art that baseband processing unit 102 includes a processor that may perform any type of process and/or algorithm on electronic signals. Processes and/or algorithms include, but are not limited to, digital beamforming techniques that process one or more signals from the one or more BF modules 108 independently or jointly. Digital beamforming may implement functions such as, but not limited to, removing interferences and/or enhancing a signal-to-noise ratio of the one or more processed signals and/or signals between antenna elements within one BF module 108. Baseband processing unit 102 may also perform baseband processing for other wireless protocols and/or standards.

It may be appreciated by a person with ordinary skill in the art that one or more cables 106 may be any type of medium capable of sending signals and/or power. Cables 106 may be, but not limited to, fiber optic cables, coaxial cables, IPEX/IPX cables, and/or ethernet cables with the any necessary coupling apparent by a person with ordinary skill in the art. In one embodiment of the present invention, cables 106 may be fiber optic cables carrying signals and/or power at various optical wavelengths.

It may be appreciated by a person with ordinary skill in the art that one or more cables 106 may carry signals at one or more frequencies for each cable 106. In one embodiment of the present invention a single cable 106 may carry multiple signals at a plurality of frequencies.

It may be appreciated by a person with ordinary skill in the art that a BF module 108 may include any type of beamforming antenna in any orientation. BF module 108 antennas may include, but not limited to, phased array antennas, steerable antennas, and/or reconfigurable antennas. In one embodiment of the present invention, a plurality of phased array antennas are orientated in a circular formation. In another embodiment of the present invention, a plurality of phased array antennas are orientated in a stacked up three-dimensional formation.

It may be appreciated by a person with ordinary skill in the art that a BF module 108 may operate at any frequency range. Frequency ranges may be, but not limited to, from 6 to 600 GHz, to handle various wireless technologies and standards which may include, but not limited to, cellular communications, wireless local area network (WLAN) communications, global navigation satellite system (GLASS) communications, millimeter wave (mmWave) unications, terahertz (THz) communications, visible-light communications, near field communications (NFC) and/or other wireless communications. In one embodiment of the present invention, a plurality of BF modules 108 may cover a plurality of standard wireless communications frequencies such that a DPA-MIMO wireless communications architecture 100 may function at a plurality of wireless communication protocols.

It may be appreciated by a person with ordinary skill in the art that any signal and/or power may be sent between one or more elements of DPA-MIMO wireless communication architecture 100. Signals and/or power sent between one or more elements may include, but not limited to, direct current (DC) power, control signals, reference signals, and/or feedback signals. In one embodiment of the present invention, an IF radio 104 may provide DC power to one or more BF modules 108 through one or more cables 106. In another embodiment of the present invention, one or more IF radios 104 may send control and reference signals through one or more cables 106 to one or more BF modules 108. BF modules 108 may send feedback signals back to IF radios 104 through cables 106.

It may be appreciated by a person with ordinary skill in the art that one or more elements of DPA-MIMO wireless communication architecture 100 may be combined into a single functional group or separated into a plurality of functional groups. In one embodiment of the present invention, a plurality of sets each comprising of an IF radio 104, a cable 106, and a BF module 108 may work individual functions such as, but not limited to, communications at a specific frequency, communications in a specific data stream, transmitting signals, and/or receiving signals. In another embodiment of the present invention, a plurality of sets comprising of one or more IF radios 104, cables 106, and BF modules 108 may work a single function such as, but not limited to, communications at a specific frequency, communications in a specific data stream, transmitting signals, and/or receiving signals.

It may be appreciated by a person with ordinary skill in the art that one or more BF modules 108 may cover a wide frequency range. A frequency ranged covered by one or more BF modules 108 may include, but not limited to, WiFi bands beyond 6 GHz, wireless gigabit (WiGig) bands from 57-71 GHz, and/or frequencies used by other wireless standards, licensed and unlicensed spectrum frequencies.

Figure 2:
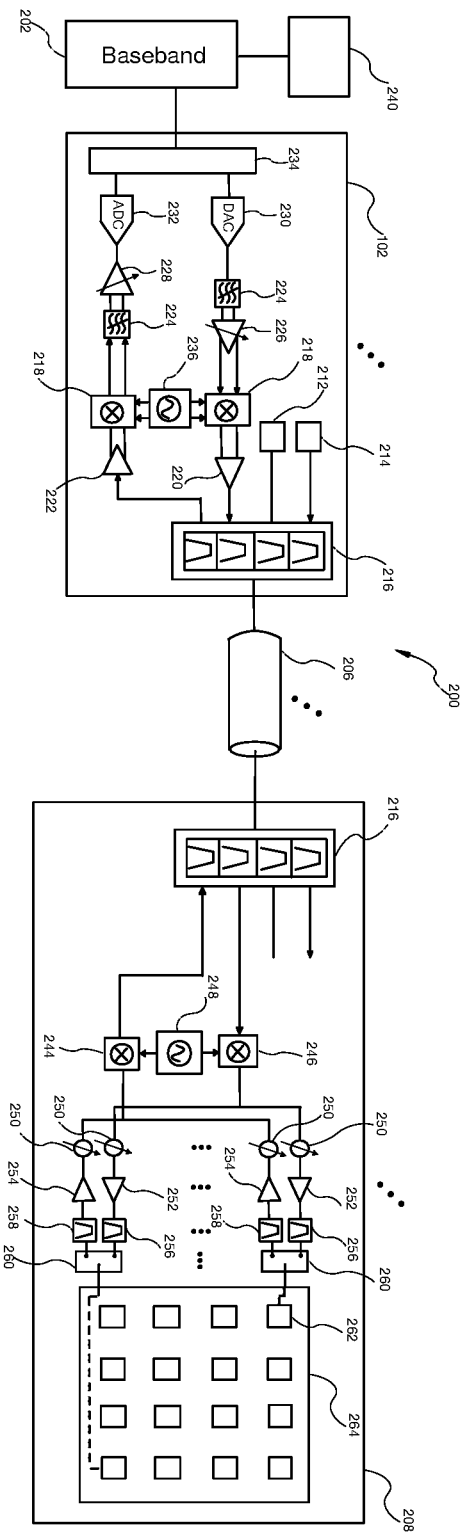
FIG. 2 illustrates a detailed perspective of an exemplary distributed phase array multiple-input-multiple-output system, in accordance with an embodiment of the present invention.

FIG. 2 illustrates a detailed perspective of an exemplary DPA-MIMO system 200, in accordance with an embodiment of the present invention. A DPA-MIMO wireless communication system 200 comprises of a baseband processing unit 202, one or more intermediate frequency (IF) radios 204, one or more cables 206, and one or more BE modules 208. Baseband processing unit 202 may be further connected to one or more radio frequency (RF) systems 240 which may include any RF front ends and/or antenna apparent by a person with ordinary skill in the art.

BF module 208 comprises of an antenna array 264, one or more quadplexers 216, one or more local oscillators 248, one or more transmission signal mixers 246, one or more receive signal mixers 244, two or more phase shifters 250, one or more power amplifiers 252, one or more low-noise amplifiers 254, one or more transmission band filters 256, one or more tunable receive band filters 258, and one or more time controlled switches 260. Antenna array 264 may further comprise of one or more antenna elements 262.

Antenna array 264 may comprise of one or more antenna elements 262 which may be of heterogeneous or homogeneous type, shape, polarization, orientation and design. It may be appreciated by a person with ordinary skill in the art that antenna elements 262 may be selected and/or orientated based on specific DPA-MIMO wireless communication system 200 design and/or an application requirement.

IF radio module 204 comprises of one or more quadplexers 216, a control-reference generator 212, a power supply generator 214, one or more local oscillators 236, one or more low-pass filters 224, one or more automatic gain control units 226 and 228, one or more analog-to-digital converters (ADC) 232, a digital interface 234, one or more digital-to-analog converters (DAC) 230, a plurality of signal mixers 218, one or more transmission filters 224, and two or more signal amplifiers 220 and 222.

During typical operation within a BF module 208, one or more antenna elements 262 may be directly connected to a time controlled switch 260 that may route the signal for an uplink or a downlink path. A downlink path may have a tunable receive band filter 258 placed between a time controlled switch 260 and one or more low noise amplifiers 254. Each low-noise amplifiers 254 are followed by one or more phase shifters 250. Output signals from one or more phase shifters 250 of multiple paths may be combined to be downconverted to IF signals by a local oscillator 248 and a receive signal mixer 244. A generated IF signal may be then delivered to one or more quadplexers 216 in one or more IF radios 204 via one or more cables 206. A BF module 208 may comprise of transceiver circuits including multiple uplink and downlink paths connected to one or more antenna arrays 264.

A transmission path within BF module 208 may begin by receiving signals from quadplexer 216 via one or more cables 206. Signals received from quadplexer 216 may be upconverted by a local oscillator 248 and a transmission signal mixer 246. An output signal from transmission signal mixer 246 is sent to multiple phase shifters 250, one or more phase shifters 250 at a path where one or more power amplifiers 252 may direct an amplified output signal to one or more transmission band filters 256. A filtered output signal from the one or more transmission band filters 256 may be sent to a time controlled switch 260 and routed to a corresponding antenna element 262 for transmission.

During typical operation within a IF radio 204, one or more quadplexers 216 may deliver power from a power supply generator 214 to one or more BE modules 208 via one or more cables 206. A control-reference generator 212 generates control and/or reference signals. The control-reference generator 212 may also receive feedback signals that may include, but not limited to, an indication of communication quality and temperature of BF modules 208.

A downlink path within IF radio 204 begins with output signals received at one or more quadplexers 216. One or more signal amplifiers 222 may perform functions such as, but not limited to, amplification and transforming single-ended signals to differential signals. Signals from signal amplifiers 222 may be downconverted into one or more baseband analog signals by a local oscillator 236 and a signal mixer 218. The baseband analog signals may be filtered by one or more low-pass filters 224. An amplitude of a filtered baseband signal may be adjusted by one or more automatic gain control units 228. A filtered and/or amplified baseband signal may be digitized by an ADC 232. A digital interface 234 bridges the digitized baseband signal from ADC 232 to baseband processing unit 202.

An uplink path within IF radio 204 begins with digital baseband signals being transformed to analog baseband signals through one or more DAC, 230. The analog baseband signals may be filtered through one or more low-pass filters 224. One or more automatic gain control units 226 may adjust the amplitude of a filtered analog baseband signal from the low-pass filters 224. Filtered and/or amplitude adjusted signals may be frequency upconverted by a local oscillator 236 and a signal mixer 218. One or more signal amplifiers 220 may further amplify an upconverted signal from signal mixer 218 before sending the upconverted signal to one or more quadplexers 216. Signals may be sent from quadplexers 216 to one or more BF modules 208 via one or more cables 206.

It may be appreciated by a person with ordinary skill in the art that baseband processing unit 202 includes a processor that may perform any type of process and/or algorithm on electronic signals. Processes and/or algorithms include, but are not limited to, digital beamforming techniques that process one or more signals from the one or more BE modules 208 independently or jointly. BF modules 208 may also perform functions such as, but not limited to, removing interferences and/or enhancing a single to noise ratio of the one or more processed signals and/or signals between antenna elements within one BF module 208. Baseband processing unit 202 may also perform baseband processing for other wireless protocols and/or standards.

It may be appreciated by a person with ordinary skill in the art that a BF module 208 may operate at any frequency range. Frequency ranges may be, but not limited to, from 6 to 600 GHz, to handle various wireless technologies and standards which may include, but not limited to, cellular communications, WLAN communications, GNSS communications, mmWave communications, THz communications, visible-light communications, NFC and/or other wireless communications. In one embodiment of the present invention, a plurality of BF modules 208 may cover a plurality of standard wireless communications frequencies such that a DPA-MIMO wireless communications system 200 may function at a plurality of wireless communication protocols.

It may be appreciated by a person with ordinary skill in the art that a plurality of IF radios 204 may operate at same or different frequency ranges, each of which operates at a frequency depending on the working frequency of its connected BF module 208. The operating frequencies of IF radio 204 and BF module 208 may be designed jointly.

It may be appreciated by a person with ordinary skill in the art that one or more quadplexers 216 may be multiplexers of any size and/or number. In one embodiment of the present invention, quadplexers 216 may be a hexplexer. In another embodiment of the present invention, quadplexers 216 may be a chain of smaller multiplexers.

It may be appreciated by a person with ordinary skill in the art that RF system 240 may be for any wireless communication standard. Wireless communication standards include, but not limited to, the $2^{nd}$ Generation cellular system (2G), the $3^{rd}$ Generation cellular system (3G), the $4^{th}$ Generation cellular system (4G), WLAN, Bluetooth, and/or other wireless standards. In one embodiment of the present invention, RF system 240 may function at Bluetooth, NFC, and 3G wireless standards.

It may be appreciated by a person with ordinary skill in the art that one or more time controlled switches 260 may be any type, combination, and/or number of time controlled switches. Time controlled switches 260 may be, but not limited to, N-pole N-throw switches. In one embodiment of the present invention, time controlled switches 260 may be a combination of single-pole double-throw switches and single-pole triple-throw switches.

It may be appreciated by a person with ordinary skill in the art that one or more time controlled switches 260 may be any switching and/or multiplexing device to achieve any duplexing scheme for one or more BF modules 208. BF modules 208 may perform duplexing such as, but not limited to, time-division duplexing and/or frequency-division duplexing. Duplexing schemes may be achieved with different types of switches and/or multiplexers as the one or more time controlled switches 260 in BF modules 208. Duplexing switches and/or multiplexers may include, but not limited to, diplexers and/or single-pole double-throw switches. In one embodiment of the present invention, one or more BF modules 208 may have time-division duplexing with one or more time controlled switches 260 as single-pole double-throw switches. In another embodiment of the present invention, one or more BF modules 208 may have frequency-division duplexing with one or more time controlled switches 260 replaced as diplexers.

Figure 3:
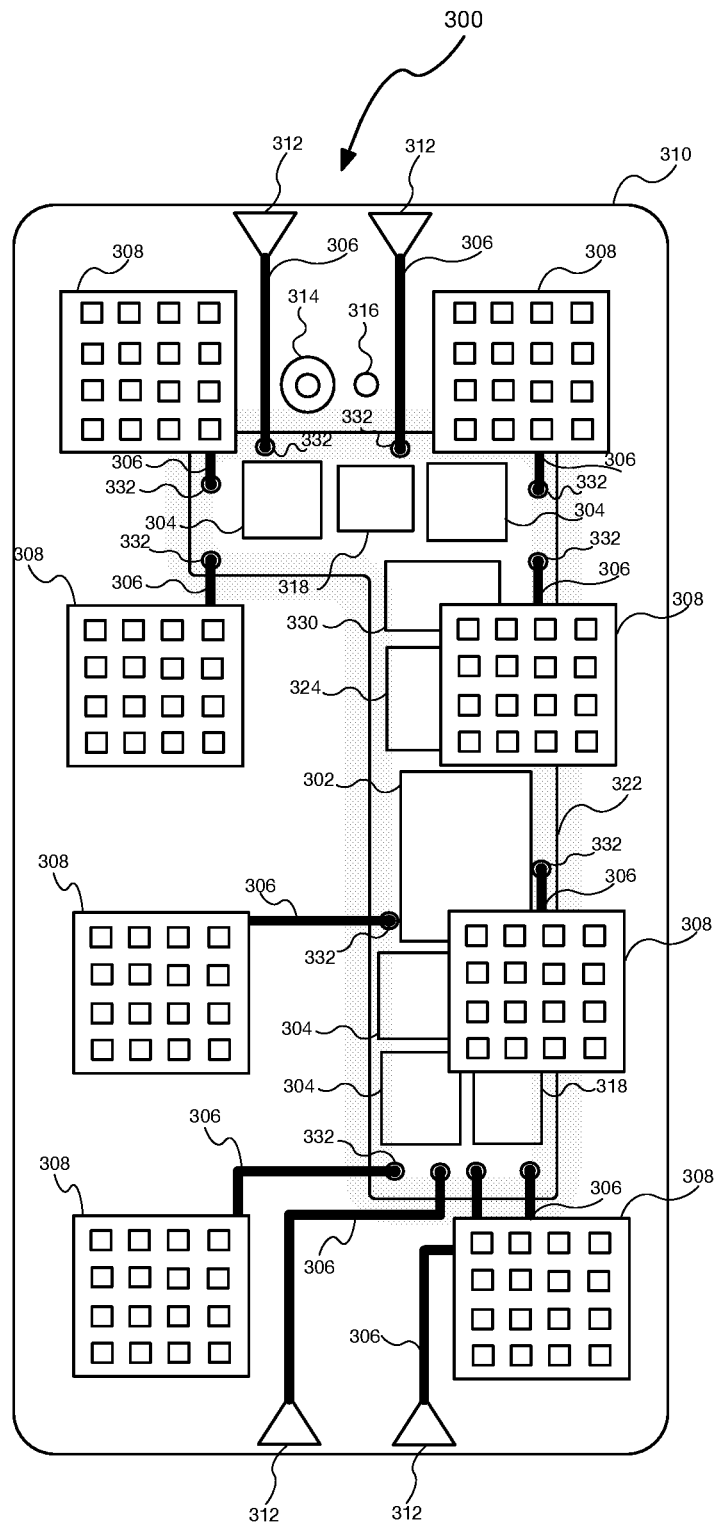
FIG. 3 illustrates a top view of an exemplary user equipment device based on DPA-MIMO architecture, in accordance with an embodiment of the present invention.

FIG. 3 illustrates a top view of an exemplary user equipment device 300 based on DPA-MIMO architecture, in accordance with an embodiment of the present invention. A user equipment device 300 comprises of a rear housing 310, a camera 314, a LED light 316, one or more wireless protocol chipsets 318, one or more cellular sub-6 GHz antennas 312, a main logic board 322, a baseband processing unit 302, one or more IF radios 304, one or more cables 306, and one or more beamforming (BF) modules 308.

Main logic board 322 may be connected to the one or more IF radios 304, baseband processing unit 302, cable connectors 332, and one or more wireless protocol chipsets 318. One or more cables 306 may be used to connect one or more BF modules 308 and one or more sub-6 GHz antennas 312 to main logic board 322 at cable connectors 332. Peripherals such as, but not limited to, camera 314, LED light 316, and/or one or more wireless protocol chipsets 318 may be additionally connected to main logic board 322.

One or more BF modules 308 may be placed within rear housing 310 in a distributed way with an edge-to-edge spacing that maximally reduces mutual coupling and propagation interference, and enhances signal diversity and signal quality among beamforming modules, taking into account available physical space, beamforming module dimension, total number of beamforming modules, heat dissipation, and/or target spatial multiplexing gain, and/or target diversity gain. In one embodiment of the present invention, a plurality of BF modules 308 are placed such that a necessary edge-to-edge spacing of more than 1.5 times a free space wavelength is maintained. A placement for BF modules 308 may be determined according to any application requirements such as, but not limited to, physical requirements, heat dissipation, and/or spatial multiplexing gain.

It may be appreciated by a person with ordinary skill in the art that one or more wireless protocol chipsets 318 may be for any combination of wireless protocols. Wireless protocol chipsets 318 may adhere to protocols such as, but not limited to, WiFi, Bluetooth, GNSS, and/or NFC. In one embodiment of the present invention, user equipment device 300 comprises of a plurality of heterogeneous wireless protocol chipsets 318 to provide Bluetooth, WiFi, GNSS, and NFC communication functionality.

It may be appreciated by a person with ordinary skill in the art that the placement and number of any elements in user equipment device 300 may be determined by any metrics and/or purposes. Metrics and/or purposes may include, but not limited to, heat dissipation, power usage, signal quality, and/or device aesthetic. In one embodiment of the present invention, a plurality of BF modules 308 may be placed in a grid pattern at 1.5 times a free-space wavelength in order to optimize any wireless signal strength.

It may be appreciated by a person with ordinary skill in the art that a user equipment device 300 and/or rear housing 310 may be implemented in any form. Forms that user equipment device 300 and/or rear housing 310 may take include, but not limited to, cellular phones, tablets, computers, laptops, virtual reality headsets, wearable devices, and/or vehicles. In one embodiment of the present invention, user equipment device 300 and rear housing 310 may be in the form of a smart television.

It may be appreciated by a person with ordinary skill in the art that one or more cellular sub-6 GHz antennas 312 may be one or more antennas for any frequency. Cellular sub-6 GHz antennas 312 may also be heterogeneous or homogenous antennas. Cellular sub-6 GHz antennas 312 may be, but not limited to, Bluetooth antennas, WLAN antennas, and/or super-high frequency radio antennas. In one embodiment of the present invention, cellular sub-6 GHz antennas 312 may be a plurality of heterogeneous antennas covering a range of frequencies.

It may be appreciated by a person with ordinary skill in the art that a main logic board 322 may accommodate any hardware components of a user equipment device 300. Hardware components may include, but not limited to, a computer processor, one or more computer memory modules, and/or additional copies of elements within user equipment 300. In one embodiment of the present invention, main logic board 322 may accommodate a plurality of battery controllers.

Figure 4:
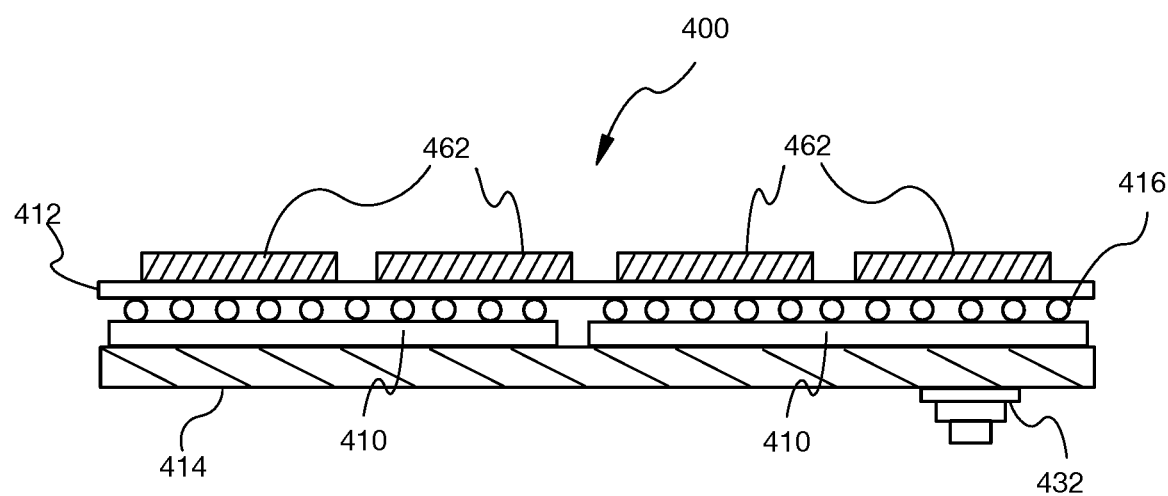
FIG. 4 illustrates a side view of an exemplary beamforming module, in accordance with an embodiment of the present invention.

FIG. 4 illustrates a side view of an exemplary beamforming (BF) module 400, in accordance with an embodiment of the present invention. A BF module 400 comprises of one or more radio frequency integrated circuits (REWs) 410, a substrate layer 412, a printed circuit board (PCB) layer 414, one or more stud bumps 416, one or more cable couplers 432, and one or more antenna elements 462.

Substrate layer 412 may hold one or more antenna elements 462. One or more stud bumps 416 may be beneath substrate layer 412 for purposes including, but not limited to, maintaining mechanical stability and/or signal routing between one or more antenna elements 462 and RFICs 410. RFICs 410 may integrate function blocks such as, but not limited to, low-noise amplifiers, power amplifiers, phase shifters, filters, single-pole double-throw switches, local oscillators, and/or other necessary circuitry for functions that may be present in BF module 400. RFICs 410 may be created with different fabrication processes and/or integrate different function blocks that may be suitable for one or more fabrication processes. RFICs 410 may also be an RFIC die without packaging. PCB layer 414 may mount one or more RFICs 410, one or more cable couplers 432, and/or one or more stud bumps 416.

It may be appreciated by a person with ordinary skill in the art that one or more stud bumps 416 may be materials of any physical properties required for a function. Stud bumps 416 may be created from materials with properties such as, but not limited to, conductivity, malleability, and/or size. In one embodiment of the present invention, stud bumps 416 may be a heterogeneous collection of conductive and non-conductive stud bumps make from solder and rubber respectively.

It may be appreciated by a person with ordinary skill in the art that one or more antenna elements 462 may be one or more antennas for any frequency. Antenna elements 462 may also be heterogeneous or homogenous antennas. Antenna elements 462 may be, but not limited to, Bluetooth antennas, WLAN antennas, millimeter wave antennas, terahertz antennas, and/or super-high frequency radio antennas. In one embodiment of the present invention, antenna elements 462 may be a plurality of heterogeneous antennas covering a range of frequencies.

It may be appreciated by a person with ordinary skill in the art that one or more antenna elements 462 may include any type of antenna in any orientation. Antenna elements 462 may include, but not limited to, phased array antennas, steerable antennas, and/or reconfigurable antennas. In one embodiment of the present invention, a plurality of phased array antennas are orientated in a circular formation on a substrate layer 412. In another embodiment of the present invention, a plurality of phased array antennas are orientated in a stacked up three-dimensional formation.

Figure 5:
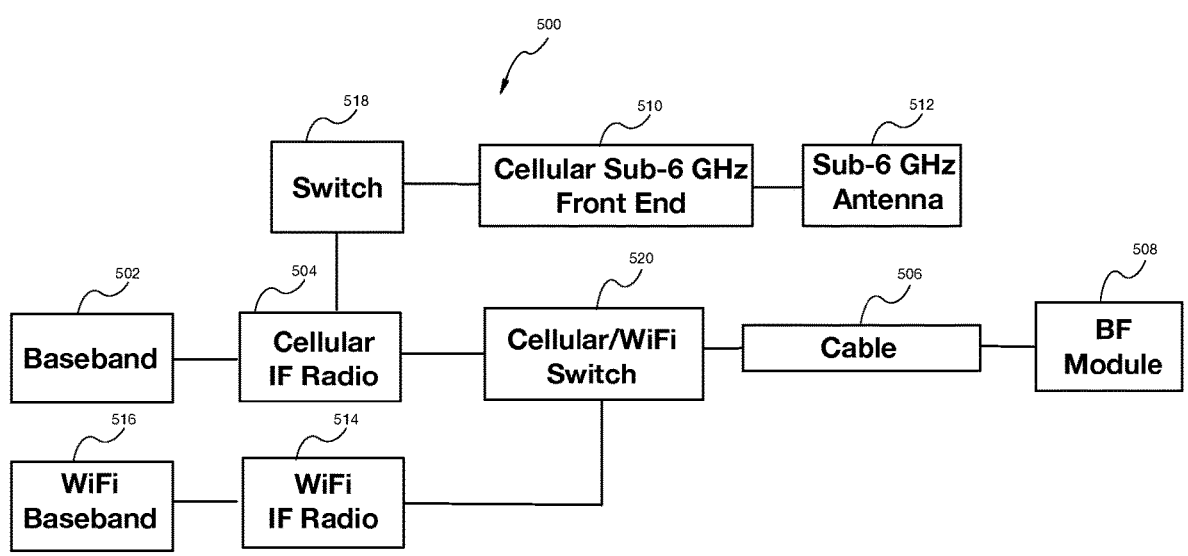
FIG. 5 illustrates a top level system diagram of a multiplexed distributed phased array multiple-input-multiple-output wireless communication architecture, in accordance with an embodiment of the present invention.

FIG. 5 illustrates a top level system diagram of a multiplexed distributed phased array multiple-input-multiple-output wireless communication architecture 500, in accordance with an embodiment of the present invention. A multiplex DPA-MIMO wireless communication architecture 500 comprises of a baseband processing unit 502, one or more cellular intermediate frequency (IF) radios 504, one or more cables 506, one or more beamforming (BF) modules 508, one or more switches 518, a cellular sub-6 GHz front end 510, one or more cellular sub-6 GHz antennas 512, one or more cellular-WiFi switches 520, one or more WiFi IF radios 514, and a Win baseband processing unit 516. Baseband processing unit 502 may handle all baseband signals for all cellular IF radios 504. Electronic signals and/or power may travel from cellular IF radios 504 through one or more cables 506 to one or more BF modules 508. BF module 506 may be configured to receive and/or transmit wireless data. One or more cellular-WiFi switches 520 may be inserted between one or more cables 506 and one or more cellular IF radios 504. The cellular-WiFi switches 520 may enable a signal path between one or more cables 506 and one or more cellular IF radios 504 or one or more WiFi IF radios 514. One or more switches 518 may be inserted between one or more cellular IF radios 504 and a cellular sub-6 GHz front end 510. Cellular sub-6 GHz front end 510 may operate below 6 GHz and may include power amplifiers, low-noise amplifiers, antenna switching modules, and/or filters. One or more cellular sub-6 GHz antennas 512 may be connected to every cellular sub-6 GHz front end 510.

During a typical receive operation, henceforth also known as a downlink path, BF module 508 receives wireless signals and downconverts the wireless signals to an intermediate frequency (IF) range. BF modules 508 may form wireless transmission beams independently or jointly pointing to any directions with any beamwidths that are amenable to reception in a given propagation environment. The wireless signals in the cellular IF range are sent through one or more cables 506 to one or more cellular IF radios 504. At IF radio 504, IF range wireless signals are further downconverted in the frequency domain and sent to baseband processing unit 502 for processing.

During a typical transmit operation, henceforth also known as an uplink path, baseband processing unit 502 generates baseband data carrying information for communication and sends the baseband signals to one or more cellular IF radios 504. Cellular IF radios 504 upconverts the baseband signals to one or more intermediate frequencies which are sent through one or more cables 506 to one or more BF modules 508. BF modules 508 upconverts any received IF signals to one or more predetermined transmission frequencies. BF modules 508 further forms a wireless transmission beams independently or jointly pointing to any directions with any beamwidths that are amenable to transmission in a given propagation environment and sends wireless signals at transmission frequencies.

Circuit paths may be enabled or disabled based on control signals given to one or more switches 518 and one or more cellular-WiFi switches 520. When one or more switches 518 open a signal path between one or more cellular IF radios 504 and a cellular sub-6 GHz front end 510, the one or more cellular-WiFi switches 520 may disable the signal paths between the one or more cables 506 and the one or more WiFi IF radios 514. In a similar fashion, when one or more switches 518 close a signal path between one or more cellular IF radios 504 and a cellular sub-6 GHz front end 510, the one or more cellular-WiFi switches 520 may enable the signal paths between the one or more cables 506 and the one or more WiFi radios 514.

It may be appreciated by a person with ordinary skill in the art that enabling and/or disabling circuit paths with one or more switches 518 and/or cellular-WiFi switches 520 may be used to control the usage of one or more BF modules 508 and/or input/output signals to and from baseband processing unit 502. In one embodiment of the present invention, WiFi communications may be established by disabling all circuit paths to the cellular sub-6 GHz front end 510 and enabling one or more circuit paths to cellular cellular IF radios 504. In another embodiment of the present invention, time slicing usage time of BF modules 508 and/or baseband processing unit 502 may be achieved by modulating control of one or more switches 518 and/or one or more cellular-WiFi switches 520.

It may be appreciated by a person with ordinary skill in the art that baseband processing unit 502 includes a processor that may perform any type of process and/or algorithm on electronic signals. Processes and/or algorithms include, but are not limited to, digital beamforming techniques that process one or more signals from the one or more BF modules 508 independently or jointly. BF modules 508 may also perform functions such as, but not limited to, removing interferences and/or enhancing a single to noise ratio of the one or more processed signals and/or signals between antenna elements within one BF module 508. Baseband processing unit 502 may also perform baseband processing for other wireless protocols and/or standards.

It may be appreciated by a person with ordinary skill in the art that a BF module 508 may operate at any frequency range. Frequency ranges may be, but not limited to, from 6 to 600 GHz, to handle various wireless technologies and standards which may include, but not limited to, cellular communications, WLAN communications, GNSS communications, mmWave communications, THz communications, visible-light communications, NFC and/or other wireless communications. In one embodiment of the present invention, a plurality of BF modules 508 may cover a plurality of standard wireless communications frequencies such that a multiplexed DPA-MIMO wireless communications architecture 500 may function at a plurality of wireless communication protocols.

It may be appreciated by a person with ordinary skill in the art that one or more cables 506 may be any type of medium capable of sending signals and/or power. Cables 506 may be, but not limited to, fiber optic cables, coaxial cables, and/or ethernet cables with the any necessary coupling apparent by a person with ordinary skill in the art. In one embodiment of the present invention, cables 506 may be fiber optic cables carrying signals and/or power at various optical wavelengths.

It may be appreciated by a person with ordinary skill in the art that one or more cables 506 may carry signals at one or more frequencies for each cable 506. In one embodiment of the present invention a single cable 506 may carry multiple signals at a plurality of frequencies.

It may be appreciated by a person with ordinary skill in the art that a BF module 508 may include any type of antenna in any orientation. BF module 508 antennas may include, but not limited to, phased array antennas, steerable antennas, and/or reconfigurable antennas, in one embodiment of the present invention, a plurality of phased array antennas are orientated in a circular formation.

It may be appreciated by a person with ordinary skill in the art that any signal and/or power may be sent between one or more elements of DPA-MIMO wireless communication architecture 500. Signals and/or power sent between one or more elements may include, but not limited to, direct-current (DC) power, control signals, reference signals, and/or feedback signals. In one embodiment of the present invention, a cellular IF radio 504 may provide DC power to one or more BF modules 508 through one or more cables 506. In another embodiment of the present invention, one or more cellular IF radios 504 may send control and reference signals through one or more cables 506 to one or more BF modules 508. BF modules 508 may send feedback signals back to cellular IF radios 504 through cables 506.

It may be appreciated by a person with ordinary skill in the art that one or more elements of DPA-MIMO wireless communication system 500 may be combined into a single functional group or separated into a plurality of functional groups. In one embodiment of the present invention, a plurality of sets each comprising of a cellular IF radio 504, a cable 506, and a BF module 508 may work individual functions such as, but not limited to, communications at a specific frequency, communications in a specific data stream, transmitting signals, and/or receiving signals. In another embodiment of the present invention, a plurality of sets comprising of one or more cellular IF radios 504, cables 506, and BF modules 508 may work a single function such as, but not limited to, communications at a specific frequency, communications in a specific data stream, transmitting signals, and/or receiving signals.

It may be appreciated by a person with ordinary skill in the art that one or more BF modules 508 may cover a wide frequency range. A frequency ranged covered by one or more BF modules 508 may include, but not limited to, WiFi bands beyond 6 GHz, wireless gigabit (WiGig) bands from 57-71 GHz, and/or frequencies used by other wireless standards, and/or licensed and unlicensed spectrum frequencies.

It may be appreciated by a person with ordinary skill in the art that one or more cellular-IF radios 504, one or more switches 518, a cellular sub-6 GHz front end 510, one or more cellular sub-6 GHz antennas 512, one or more cellular-WiFi switches 520, one or more WiFi IF radios 514, and a WiFi baseband processing unit 516 may be hardware designed for any wireless frequency and/or protocol. In one embodiment of the present invention, one or more switches 518, a cellular sub-6 GHz front end 510, and one or more cellular sub-6 GHz antennas 512 may be switches, front ends, and antennas designed for super-high frequency wireless communications.

It may be appreciated by a person with ordinary skill in the art that multiplexed DPA-MIMO wireless communication architecture 500 and any comprising elements may be configured for any wireless communication frequencies. Wireless communication frequencies may include, but not limited to, Bluetooth, NFC, cellular frequencies, and/or radio frequencies. In one embodiment of the present invention, one or more WiFi IF radios 514 and one or more WiFi baseband processing units 516 may be configured for Bluetooth frequencies while one or more cellular sub-6 GHz front ends 510 and one or more cellular sub-6 GHz antennas 512 may be configured for NFC frequencies.

Figure 6:
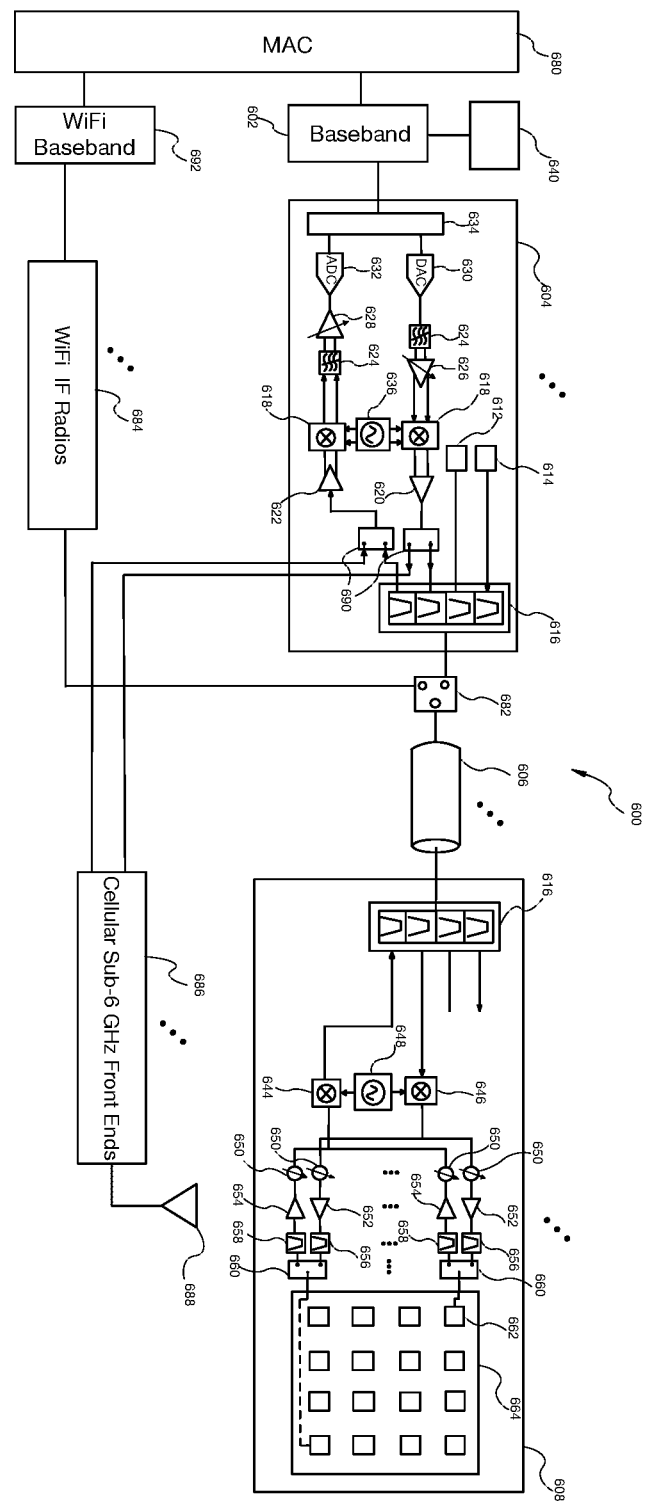
FIG. 6 illustrates a detailed perspective of a multiplexed distributed phased array multiple-input-multiple-output wireless communication system, in accordance with an embodiment of the present invention.

FIG. 6 illustrates a detailed perspective of a multiplexed DPA-MIMO wireless communication system 600, in accordance with an embodiment of the present invention. A multiplexed DPA-MIMO wireless communication system 600 comprises of a baseband processing unit 602, one or more IF radios 604, one or more cables 606, one or more BF modules 608, a medium access control (MAC) block 680, one or more cellular-WiFi switches 682, one or more WiFi IF radios 684, one or more WiFi baseband processing units 692, one or more cellular sub-6 GHz front ends 686, and one or more cellular sub-6 GHz antennas 688. Baseband processing unit 602 may be further connected to one or more radio frequency (RF) systems 640 which may include any RF front ends and/or antenna apparent by a person with ordinary skill in the art.

BF module 608 comprises of an antenna array 664, one or more quadplexers 616, one or more local oscillators 648, one or more transmission signal mixers 646, one or more receive signal mixers 644, one or more phase shifters 650, one or more power amplifiers 652, one or more low noise amplifiers 654, one or more transmission band filters 656, one or more tunable receive band filters 658, and one or more time controlled switches 660. Antenna array 664 may further comprise of one or more antenna elements 662.

Antenna array 664 may comprise of one or more antenna elements 662 which may be of heterogeneous type, shape, and design. It may be appreciated by a person with ordinary skill in the art that antenna elements 662 may be selected and/or orientated based on specific multiplexed DPA-MIMO wireless communication system 600 design and/or an application requirement.

IF radio module 604 comprises of one or more quadplexers 616, a control-reference generator 612, a power supply generator 614, a local oscillator 636, one or more low-pass filters 624, one or more automatic gain control units 626 and 628, one or more ADC 632, a digital interface 634, one or more DAC 630, a plurality of signal mixers 618, one or more transmission filters 624, two or more signal amplifiers 620 and 622, and one or more switches 690.

MAC block 680 may be designed to work with signals from baseband processing unit 602 and WiFi baseband processing unit 692. MAC block 680 may contain algorithms and/or protocols which may enable communication between baseband processing unit 602 and WiFi baseband processing unit 692. Communication between baseband processing unit 602 and WiFi baseband processing unit 692 may include, but not limited to, cooperation between cellular and WiFi functions based on usage and/or application scenarios, supporting co-enabling cellular and WiFi functions in baseband processing unit 602 and/or WiFi baseband processing unit 692, and/or carrier frequency aggregation of license and unlicensed frequency bands.

During typical operation within a BF module 608, one or more antenna elements 662 may be directly connected to a time controlled switch 660 that may route the signal for an uplink or a downlink path. A downlink path may have a tunable receive band filter 658 placed between a time controlled switch 660 and one or more low noise amplifiers 654. Each low-noise amplifiers 654 are followed by a phase shifter 650, Output signals from one or more phase shifters 650 may be combined to be downconverted to IF signals by a local oscillator 648 and a receive signal mixer 644. A generated IF signal may be then delivered to one or more quadplexers 616 in one or more IF radios 604 via one or more cables 606.

A transmission path within BF module 608 may begin by receiving signals from quadplexer 616 via one or more cables 606. Signals received from quadplexer 616 may be upconverted by a local oscillator 648 and a transmission signal mixer 646. An output signal from transmission signal mixer 646 is sent to multiple phase shifters 650, one phase shifter 650 at a path where one or more power amplifiers 652 may direct an amplified output signal to one or more transmission band filters 656. A filtered output signal from the one or more transmission band filters 656 may be sent to a time controlled switch 660 and routed to a corresponding antenna element 662 for transmission.

During typical operation within an IF radio 604, one or more quadplexers 616 may deliver power from a power supply generator 614 to one or more BF modules 608 via one or more cables 606. A control-reference generator 612 generates control and/or reference signals and may also receive feedback signals.

A downlink path within radio 604 begins with output signals received at one or more quadplexers 616. One or more signal amplifiers 622 may perform functions such as, but not limited to, amplification and transforming single-ended signals to differential signals. Signals from signal amplifiers 622 may be downconverted into one or more baseband analog signals by a local oscillator 636 and a signal mixer 618. The baseband analog signals may be filtered by one or more low-pass filters 624. An amplitude of a filtered baseband signal may be adjusted by one or more automatic gain control units 628. A filtered and/or amplified baseband signal may be digitized by an ADC 632. A digital interface 634 bridges the digitized baseband signal from ADC 632 to baseband processing unit 602.

An uplink path within IF radio 604 begins with digital baseband signals being transformed to analog baseband signals through one or more DAC 630. The analog baseband signals may be filtered through one or more low pass filters 624. One or more automatic gain control units 626 may adjust the amplitude of a filtered analog baseband signal from the low-pass filters 624. Filtered and/or amplitude adjusted signals may be frequency upconverted by a local oscillator 636 and a signal mixer 618. One or more signal amplifiers 620 may further amplify an upconverted signal from signal mixer 618 before sending the upconverted signal to one or more quadplexers 616. Signals may be sent from quadplexers 616 to one or more BF modules 608 via one or more cables 606.

Circuit paths may be enabled or disabled based on control signals given to one or more switches 690 and one or more cellular-WiFi switches 682. When one or more switches 690 open a signal path between the two or more signal amplifiers 620 and 622 and the one or more cellular sub-6 GHz front ends 686, the one or more cellular-WiFi switches 682 may disable the signal paths between the one or more cables 606 and the one or more WiFi IF radios 684. In a similar fashion, when one or more switches 690 close a signal path between between the two or more signal amplifiers 620 and 622 and the one or more cellular sub-6 GHz front ends 686, the one or more cellular-WiFi switches 682 may enable the signal paths between the one or more cables 606 and the one or more WiFi IF radios 684.

It may be appreciated by a person with ordinary skill in the art that enabling and/or disabling circuit paths with one or more switches 690 and/or cellular-WiFi switches 682 may be used to control the usage of one or more BF modules 608 and/or input/output signals to and from baseband processing unit 602. In one embodiment of the present invention, WiFi communications may be established by disabling all circuit paths to the one or more cellular sub-6 GHz front ends 686 and enabling one or more circuit paths to WiFi IF radios 684. In another embodiment of the present invention, time slicing usage time of BF modules 608 and/or baseband processing unit 602 may be achieved by modulating control of one or more switches 690 and/or one or more cellular-WiFi switches 682.

It may be appreciated by a person with ordinary skill in the art that a BF module 608 may operate at any frequency range. Frequency ranges may be, but not limited to, from 6 to 600 GHz, to handle various wireless technologies and standards which may include, but not limited to, cellular communications, WLAN communications, GNSS communications, mmWave communications, THz communications, visible-light communications, NFC and/or other wireless communications. In one embodiment of the present invention, a plurality of BF modules 608 may cover a plurality of standard wireless communications frequencies such that a multiplexed DPA-MIMO wireless communications system 600 may function at a plurality of wireless communication protocols.

It may be appreciated by a person with ordinary skill in the art that one or more quadplexers 616 may be multiplexers of any size and/or number. In one embodiment of the present invention, quadplexers 616 may be a hexplexer. In another embodiment of the present invention, quadplexers 616 may be a chain of smaller multiplexers.

It may be appreciated by a person with ordinary skill in the art that one or more IF radios 604, one or more switches 690, one or more cellular sub-6 GHz front end 686, one or more cellular sub-6 GHz antennas 688, one or more cellular-WiFi switches 682, one or more WiFi IF radios 684, and a WiFi baseband processing unit 692 may be hardware designed for any wireless frequency and/or protocol. In one embodiment of the present invention, one or more switches 690, one or more cellular sub-6 GHz front ends 686, and one or more cellular sub-6 GHz antennas 688 may be switches, front ends, and antennas designed for super-high frequency wireless communications.

It may be appreciated by a person with ordinary skill in the art that one or more time controlled switches 660 may be any type, combination, and/or number of time controlled switches. Time controlled switches 660 may be, but not limited to, N-pole N-throw switches. In one embodiment of the present invention, time controlled switches 660 may be a combination of single-pole double-throw switches and single-pole triple-throw switches.

It may be appreciated by a person with ordinary skill in the art that one or more time controlled switches 660 may be any switching and/or multiplexing device to achieve any duplexing scheme for one or more BF modules 608. BF modules 608 may perform duplexing such as, but not limited to, time-division duplexing and/or frequency-division duplexing. Duplexing schemes may be achieved with different types of switches and/or multiplexers as the one or more time controlled switches 660 in BF modules 608. Duplexing switches and/or multiplexers may include, but not limited to, diplexers and/or single pole double throw switches. In one embodiment of the present invention, one or more BF modules 608 may have time division duplexing with one or more time controlled switches 660 as single-pole double-throw switches. In another embodiment of the present invention, one or more BF modules 608 may have frequency-division duplexing with one or more time controlled switches 660 as diplexers.

It may be appreciated by a person with ordinary skill in the art that RF system 640 may be for any wireless communication standard. Wireless communication standards include, but not limited to, 2G, 3G, 4G, WLAN, Bluetooth, and/or other wireless standards. In one embodiment of the present invention, RF system 640 may function at Bluetooth, NFC, and 3G wireless standards.

It may be appreciated by a person with ordinary skill in the art that multiplexed DPA-MIMO wireless communication system 600 and any comprising elements may be configured for any wireless communication frequencies. Wireless communication frequencies may include, but not limited to, Bluetooth, NFC, cellular frequencies, and/or radio frequencies. In one embodiment of the present invention, one or more WiFi IF radios 684 and one or more WiFi baseband processing units 692 may be configured for Bluetooth frequencies while one or more cellular sub-6 GHz front ends 686 and one or more cellular sub-6 GHz antennas 688 may be configured for NFC frequencies.

Figure 7:
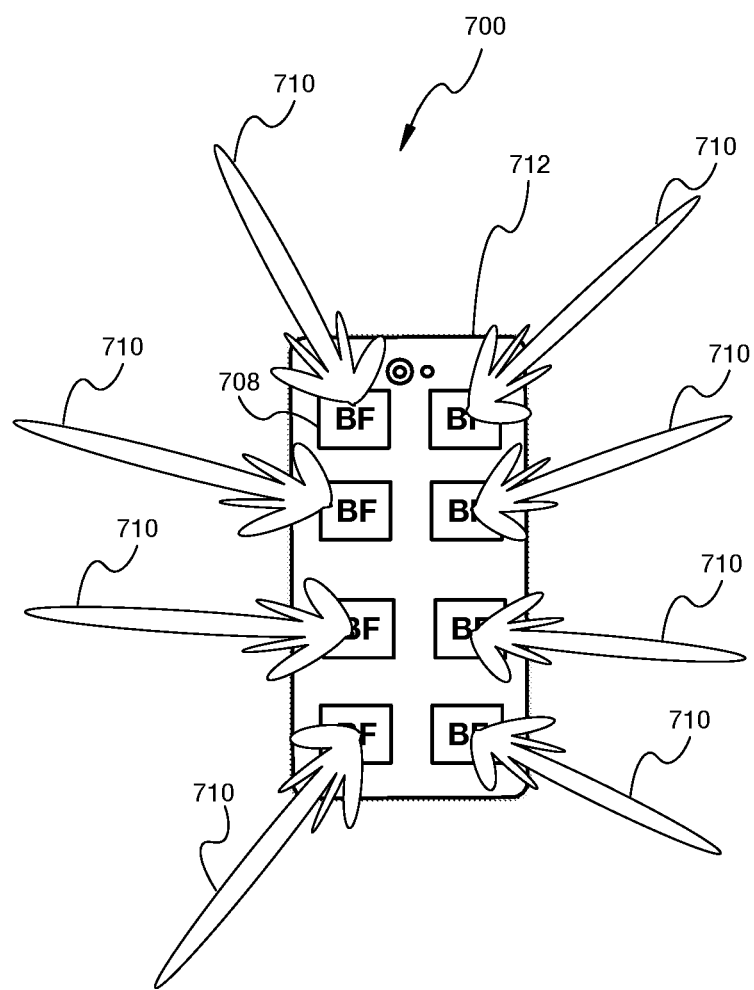
FIG. 7 illustrates a diagram of a user equipment device with multiple radiation beams, in accordance with an embodiment of the present invention.

FIG. 7 illustrates a diagram of a user equipment device 700 with multiple radiation beams, in accordance with an embodiment of the present invention. User equipment device 700 comprises of one or more BF modules 708 in a rear housing 712. Each BF module 708 may radiate one or more beams 710 which contain wireless signals for wireless communications and may comprise of a main lob and a plurality of side lobes.

It may be appreciated by a person with ordinary skill in the art that one or more BF modules 708 may shape, attenuate, and/or direct one or more beams 710. In one embodiment of the present invention, a plurality of BF modules 708 may collectively form a single, comparatively powerful beam. In another embodiment of the present invention, a plurality of BF modules 708 may form a plurality of beams 710 in a designated direction with respect to the user equipment device 700.

It may be appreciated by a person with ordinary skill in the art that one or more beams 710 may represent one or more carrier frequencies and/or one or more data streams. In one embodiment of the present invention, a plurality of beams 710 may each represent a different frequency to enable user equipment device 700 to cover a large frequency range. In another embodiment of the present invention, a plurality of beams 710 may each carry a different data stream in order to maximize the wireless bandwidth of user equipment 700.

It may be appreciated by a person with ordinary skill in the art that the rear housing 712 may house any components and/or peripherals. Components and/or peripherals may include, but not limited to, one or more cameras, one or more LEDs, screw mounts, antennas, and/or electrical modules. In one embodiment of the present invention, rear housing 712 may house a camera, an LED light, and any supporting hardware for an embodiment of a user equipment device 700.

Figure 8:
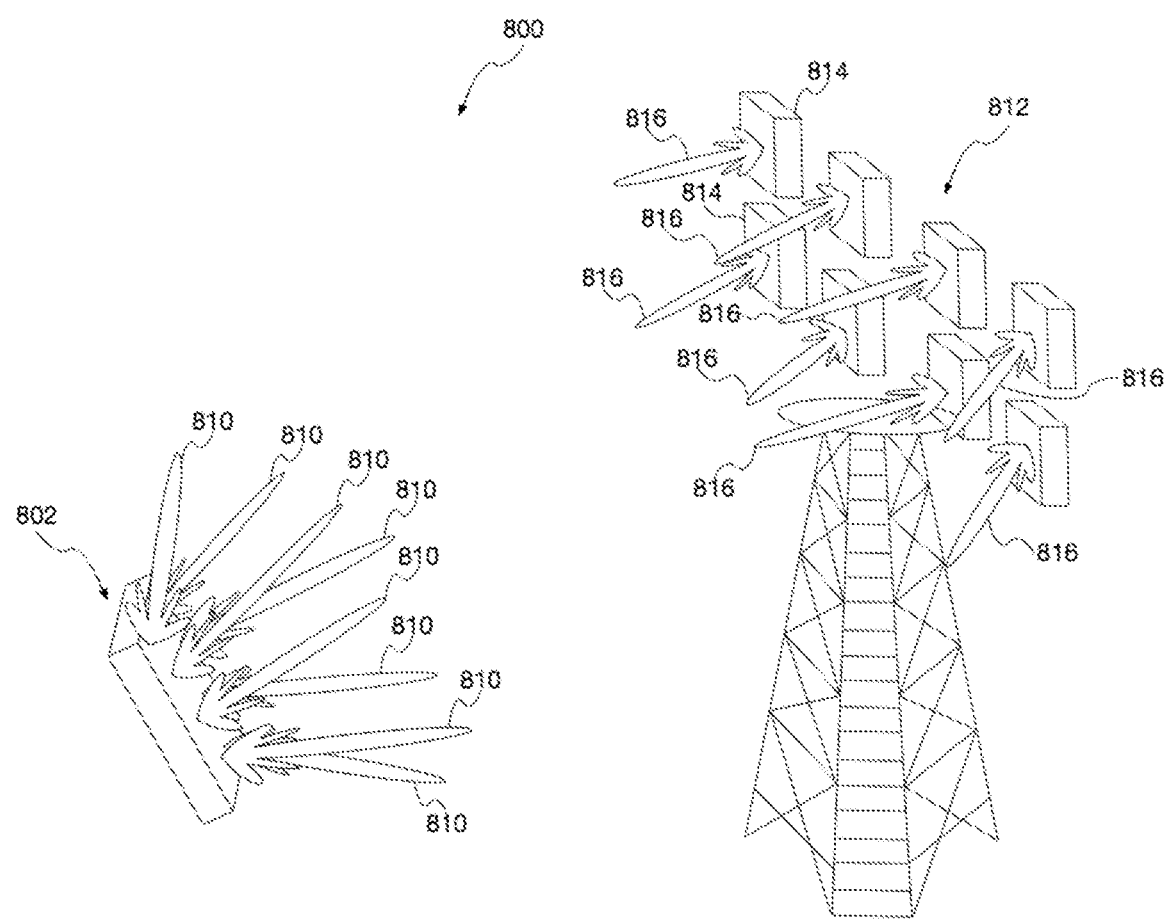
FIG. 8 illustrates a distributed phase array multiple-input-multiple-output wireless network, in accordance with an embodiment of the present invention.

FIG. 8 illustrates a DPA-MIMO wireless network 800, in accordance with an embodiment of the present invention. DPA-MIMO wireless network 800 comprises of a user equipment device 802 and a base station 812. The user equipment device 802 may further comprise of one or more wireless beams 810. The base station 812 may further comprise of one or more base station units 814 which generate one or more base station beams 816.

During typical operation, base station 812 may steer one or more base station beams 816 to user equipment device 802. The base station beams 816 may align with one or more wireless beams 810 from user equipment device 802 to create a high-performance communication line between the user equipment device 802 and the base station 812.

It may be appreciated by a person with ordinary skill in the art that one or more base station units 814 may shape, attenuate, and/or direct one or more base station beams 816. In one embodiment of the present invention, a plurality of base station units 814 may collectively form a single, comparatively powerful beam. In another embodiment of the present invention, a plurality of base station units 814 may form a plurality of base station beams 816 in a designated direction to create signal redundancy in the designated direction.

It may be appreciated by a person with ordinary skill in the art that one or more beams 810 and one or more base station beams 816 may represent one or more carrier frequencies and/or one or more data streams. In one embodiment of the present invention, a plurality of beams 810 may each represent a different frequency to enable user equipment device 802 to cover a large frequency range. In another embodiment of the present invention, a plurality of base station beams 816 may each carry a different data stream to maximize the wireless bandwidth of DPA-MIMO wireless network 800.

It may be appreciated by a person with ordinary skill in the art that there may be a plurality of user equipment device 802 and/or base station 812 in DPA-MIMO wireless network 800. In one embodiment of the present invention, a base station 812 may have each one of a plurality of base station units 814 establish a high-performance communication link with a single user equipment device 802. In another embodiment of the present invention, a plurality of base stations 812 may establish high-performance links with a single user equipment device 802 to enable signal redundancy.

It may be appreciated by a person with ordinary skill in the art that a high-performance link may be determined by one or more metrics. Metrics to determine performance in a wireless link include, but not limited to, signal strength, available bandwidth, and/or transmission speed.

Figure 9:
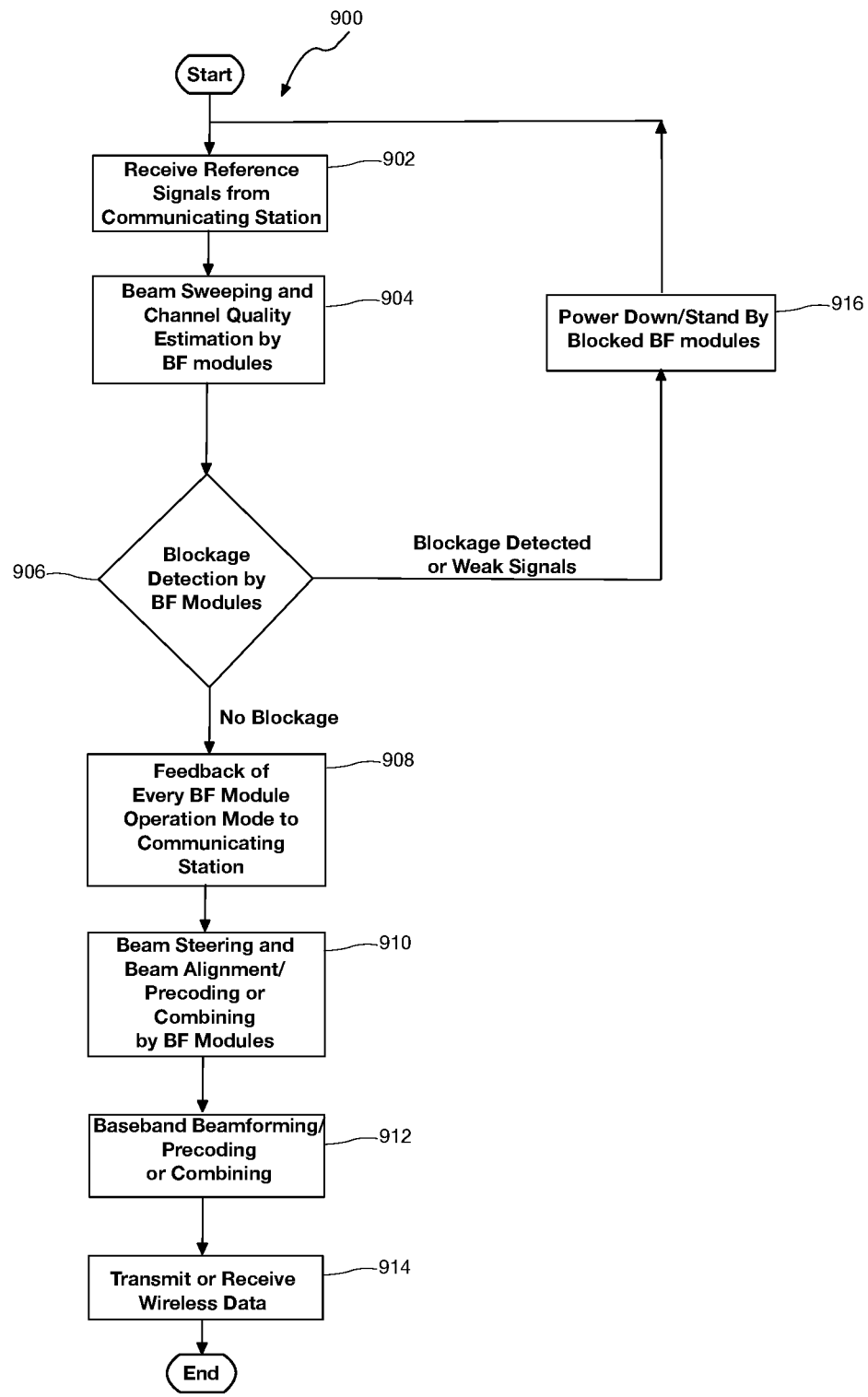
FIG. 9 is a flow chart illustrating an exemplary process for distributed phased array multiple-input-multiple-out wireless communication, in accordance with an embodiment of the present invention.

FIG. 9 is a flow chart illustrating an exemplary process for DPA-MIMO wireless communication 900, in accordance with an embodiment of the present invention. DPA-MIMO wireless communication process 900 comprises of a receive reference signal step 902, a beam sweeping step 904, a blockage detection step 906, a feedback step 908, a beam steering and combining step 910, a baseband beaming step 912, a transmit or receive step 914, and a power down step 916

Referring now to both FIG. 9 and FIG. 2, DPA-MIMO wireless communication process 900 begins with the receive reference signal step 902. A DPA-MIMO wireless communication system 200 receives one or more reference signals on one or more BF modules 208 from a communicating station outside DPA-MIMO wireless communication system 200. The one or more reference signals from an outside transmitter may be any type of signal such as, but not limited to, a short pulse, an encoded data stream, and/or a wireless beam exceeding a certain power threshold.

A beam sweeping step 904 may be performed by one or more BF modules 208 wherein beam sweeping and channel estimation are performed. A blockage detection step 906 may be performed by a processing unit such as, but not limited to, a baseband processing unit 202. The blockage detection step 906 checks for whether a BF module 208 is blocked.

If a blockage is detected in the blockage detection step 906, a power down step 916 is performed by a BF module 208. In the power down step 916, one or more BF modules 208 may power down and/or enter a stand by state. BF modules 208 may remain in a powered down and/or stand by state until a time interval has passed and DPA-MIMO wireless communication process 900 re-enters a receive reference signal step 902.

If a blockage is not detected in the blockage detection step 906 by at least one or more BF modules 208, a feedback step 908 may be initiated from baseband processing unit 202 and transmitted by one or more unblocked BF modules 208. Information such as, but not limited to, operation mode and channel condition of every BF module 208, temperature, and/or bandwidth usage may be sent back to a transmitter within DPA-MIMO wireless communication system 200.

BF modules may perform a beam steering and beam alignment step 910, in other words preceding for transmission and combining for reception. In beam steering and combining step 910, beam steering and beam alignment will be performed to optimize DPA-MIMO wireless communication system 200 metrics such as, but not limited to, signal strength, power usage, and/or transmission data rate.

The baseband beaming step 912 may be performed by a baseband processing unit 202. Baseband beaming step 912 may pre-code or combine signals within DPA-MIMO wireless communication system 200 depending whether DPA-MIMO wireless communication system 200 transmitting or receiving data. The transmit or receive step 914 may be performed by one or more BF modules 208 and transmits or receives wireless signals according to a transmission mode.

It may be appreciated by a person with ordinary skill in the art that one or more steps in the DPA-MIMO wireless communication process 900 may be added, removed, or rearranged. In another embodiment of the present invention, DPA-MIMO wireless communication process 900 may omit step the feedback step 908 to reduce latency in DPA-MIMO wireless communication system 200. In still another embodiment of the present invention, the order of beam sweeping step 904 and blockage detection step 906 in DPA-MIMO wireless communication process 900 may occur in any order. In still another embodiment of the present invention, additional steps such as, but not limited to, data encryption and/or signal multiplexing may be added to the DPA-MIMO wireless communication process 900.

It may be appreciated by a person with ordinary skill in the art that one or more steps in the DPA-MIMO wireless communication process 900 may be performed by one or more DPA-MLMO wireless communication system 200 modules, one or more electrical circuits, and/or one or more devices. The one or more of the steps of DPA-MIMO wireless communication process 900 may be performed by devices such as, but not limited to, one or more user electronic devices, a computer network, and/or one or more DPA-MIMO wireless communication systems 200. In another embodiment of the present invention, the steps of DPA-MIMO wireless communication process 900 may be performed by a networked computing device over a wireless local area network (WLAN).

Figure 10:
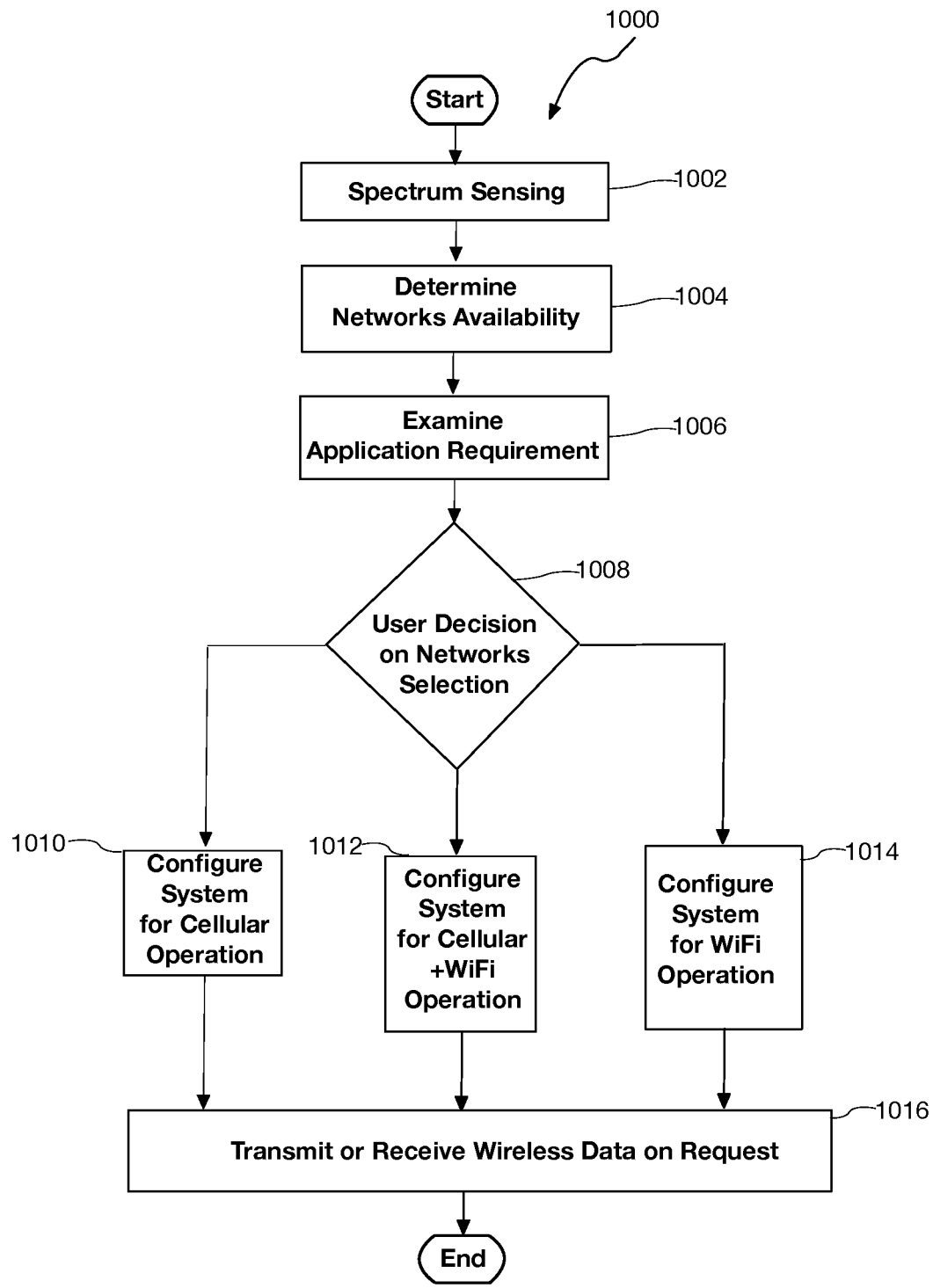
FIG. 10 is a flow chart illustrating an exemplary process for multiplexed distributed phased array multiple-input-multiple-out wireless communication accordance with embodiment of the present invention.

FIG. 10 is a flow chart illustrating an exemplary process for multiplexed distributed phased array multiple-input-multiple-out (DPA-MIMO) wireless communication 1000, in accordance with an embodiment of the present invention. A multiplexed DPA-MIMO wireless communication process 1000 comprises of a spectrum sensing step 1002, a determine network availability step 1004, an examine application requirement step 1006, a network selection step 1008, a configure cellular operation step 1010, a configure cellular and WiFi operation step 1012, a configure WiFi operation step 1014, and a transmit or receive step 1016.

Referring now to both FIG. 10 and FIG. 6, multiplexed DPA-MIMO wireless communication process 1000 begins at the spectrum sensing step 1002. One or more BF modules 608 may perform spectrum sensing to determine available frequencies and/or traffic for wireless communication.

One or more BF modules and/or a processing module may perform the determine networks availability step 1004. Network availability may be determined through passive means such as, but not limited to, sensor readings, traffic on a frequency, and/or noise on a frequency. Network availability may also be determined through active means such as, but not limited to, a message exchange between multiplexed DPA-MIMO wireless communication system 600 and a transmitter, a broadcast message from a transmitter, and/or a user input on a user equipment.

Examine application requirement step 1006 may be performed by a processing unit such as, but not limited to, a baseband processing unit 602. Examine application requirement step 1006 evaluates an application's requirements to determine a network to use. Metrics to determine a suitable network include, but are not limited to, data rates, latency, and/or user input.

At network selection step 1008, a processing unit such as, but not limited to, a baseband processing unit 602, may determine one or more networks to use based on any information from the examine application requirement step 1006. A configure cellular operation step 1010, a configure cellular and. WiFi operation step 1012, or a configure WiFi operation step 1014 may be performed based on the determination of which network must be used. Network determination may also be determined by factors such as, but not limited to, incoming wireless signals to a user device, traffic on a network, and/or a transmitter's network. It may be appreciated by a person with ordinary skill in the art that any type of wireless network may be supported. Wireless networks may be, but not limited to, Bluetooth, WiFi, NFC, and/or cellular.

In the configure cellular operation step 1010, the configure cellular and WiFi operation step 1012, and the configure WiFi operation step 1014, a network is determined in the network selection step 1008. A standalone cellular network, a cellular network and WiFi network, and a standalone WiFi network are the possible choices for a configure cellular operation step 1010, a configure cellular and WiFi operation step 1012, a configure WiFi operation step 1014 respectively. Multiplexed DPA-MIMO wireless communication system 600 configures itself for cellular network communication with switching and/or processing and initializing hardware and software such as, but not limited to, one or more cellular-WiFi switches 682, one or more cellular sub-6 GHz front ends 686, one or more time controlled switches 660, and/or a MAC block 680. In accordance with the present embodiment, multiplexed DPA-MIMO wireless communication system 600 may control WiFi and cellular operations by multiplexing shared hardware resources such as, but not limited to, one or more cables 606 and/or one or more BF modules 608.

The transmit and/or receive step 1016 may be performed by any transmission hardware such as, but not limited to, one or more BF modules 608, one or more If radio modules 604, one or more WiFi radios 684 and transmits or receives wireless signals according to a transmission mode based on the operation state of multiplexed DPA-MIMO wireless communication system 600.

It may be appreciated by a person with ordinary skill in the art that multiplexed DPA-MIMO wireless communication process 1000 is not limited to a cellular and WiFi combination. Multiplexed DPA-MIMO wireless communication process 1000 may be any combination of two or more wireless communication technologies. In one embodiment of the present invention, multiplexed DPA-MIMO wireless communication process 1000 may be configured for Bluetooth, NFC, and amateur radio wireless communications. In another embodiment of the present invention, a configure cellular operation step 1010, a configure cellular and WiFi operation step 1012, and a configure WiFi operation step 1014 may each individually configure multiplexed DPA-MIMO wireless communication system 600 for one or more wireless communication protocols.

It may be appreciated by a person with ordinary skill in the art that one or more steps in the multiplexed DPA-MIMO wireless communication process 1000 may be added, removed, or rearranged. In another embodiment of the present invention, multiplexed DPA-MIMO wireless communication process 1000 may omit step the spectrum sensing step 1002 to reduce latency in multiplexed DPA-MIMO wireless communication system 600. In still another embodiment of the present invention, the determine network availability step 1004 and the examine application requirement step 1006 in the multiplexed DPA-MIMO wireless communication process 1000 may occur in any order. In still another embodiment of the present invention, additional steps such as, but not limited to, data encryption and/or signal multiplexing may be added to the multiplexed DPA-MIMO wireless communication process 1000.

It may be appreciated by a person with ordinary skill in the art that one or more steps in the multiplexed DPA-MIMO wireless communication process 1000 may be performed by one or more multiplexed DPA-MIMO wireless communication system 600 modules, one or more electrical circuits, and/or one or more devices. The one or more of the steps of the multiplexed DPA-MIMO wireless communication process 1000 may be performed by devices such as, but not limited to, one or more user electronic devices, a computer network, and/or one or more multiplexed DPA-MIMO wireless communication systems 600. In another embodiment of the present invention, the steps of the multiplexed DPA-MIMO wireless communication process 1000 may be performed by a networked computing device over a wireless local area network (WLAN).

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of implementing distributed phased arrays based multiple-input-multiple-output (DPA-MIMO) in hardware designs according to the present invention will be apparent to those skilled in the art. Various aspects of the invention have been described above by way of illustration, and the specific embodiments disclosed are not intended to limit the invention to the particular forms disclosed. The particular implementation of the DPA-MIMO in hardware designs may vary depending upon the particular context or application. By way of example, and not limitation, the DPA-MIMO in hardware designs described in the foregoing were principally directed to consumer electronics implementations; however, similar techniques may instead be applied to the Internet of Things applications such as vehicle to vehicle or sensor to sensor communications, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

What is claimed is:

1. A system for distributed phased array multiple input multiple output (DPA-MIMO) communications, comprising:
   a baseband processing unit;
   a plurality of beamforming (BF) modules, each beamforming module comprises at least a beamforming antenna and a transceiver circuit comprising at least a downconverter that downconverts a beamformed antenna radio frequency signal to an intermediate frequency signal, and an upconverter that upconverts an intermediate frequency signal to radio frequency and sends to said beamforming antenna for transmission; and
   a plurality of intermediate frequency (IF) radios, each intermediate frequency radio comprises a receive chain circuit that includes at least a downconverter that downconverts an intermediate frequency signal sent from said BF module to a baseband signal conveyed to said baseband processing unit, and a transmit chain circuit that includes at least an upconverter that upconverts a baseband signal received from said baseband processing unit to an intermediate frequency signal that is conveyed to said beamforming module;
   wherein based on at least one of: an account available physical space, a beamforming module dimension, a total number of BF modules, heat dissipation, a target spatial multiplexing gain, or a target diversity gain, said plurality of BF modules are placed in a distributed way with an edge-to-edge spacing that maximally reduces mutual coupling and propagation interference, whereby signal diversity and signal quality are enhanced among said BF modules.

2. The system of claim 1, wherein said beamforming antenna includes a phased antenna array, a steerable antenna or a reconfigurable antenna, and is configured to form beams pointing to designated directions with particular beamwidths and gains that are amenable to transmission or reception.

3. The system of claim 2, wherein said phased antenna array comprises one or more antenna elements of homogeneous or heterogeneous type, shape, orientation, polarization and design, each antenna element is associated with two or more phase shifters that adjust the phases of antenna element signals separately.

4. The system of claim 1, wherein said plurality of beamforming modules comprise homogeneous or heterogeneous types of beamforming antennas that form wireless beams independently or jointly pointing to any directions with any beamwidths and gains that are amenable to single or multiple data streams transmission or reception.

5. The system of claim 1, wherein said plurality of beamforming modules are configured to operate in the same or different frequency bands, spanning a wide range of frequencies from GHz to millimeter wave (mmWave), Terahertz or optical frequencies.

6. The system of claim 1, wherein the edge-to-edge spacing is an edge-to-edge spacing of more than 1.5 times a free space wavelength.

7. The system of claim 1, wherein said plurality of intermediate frequency radios are configured to operate at the same or different frequency ranges, and each intermediate frequency radio further comprises a digital to analogy converter and an analog to digital converter for transmission and reception.

8. The system of claim 1, wherein said baseband processing unit performs digital beamforming on the signals conveyed from said BF modules and IF radios, independently or jointly, to further reduce interferences and enhances signal to noise ratio of processed signals.

9. The system of claim 1, further comprising a plurality of cables, wherein each cable connects one of said beamforming modules with one of said intermediate frequency radios, and carries multiple signals at one or more frequencies including intermediate frequency signals that are exchanged between the intermediate frequency radios and the beamforming modules, control signals, reference signals, direct current (DC) power or feedback signals.

10. The system of claim 9, wherein the cables are selected from a group consisting of coaxial cables, fiber optic cables, IPEX/IPX cables, and ethernet cables.

11. The system of claim 9, further comprising
   a first plurality of switches in between one or more cables and one or more IF radios,
   another plurality of IF radios that operate according to a first wireless protocol set, and
   another baseband processing unit that performs baseband processing according to the first wireless protocol set; or
   a plurality of front ends that operate according to a second wireless protocol set, and
   a second plurality of switches in between the one or more IF radios and one or more front ends operating according to the second wireless protocol set;
   wherein the first wireless protocol set or the second wireless protocol set enables multiplexing reuse of a wireless protocol used by the plurality of BF modules or the plurality of IF radios or the other plurality of IF radios.

12. The system of claim 11, wherein a first switch from the first plurality of switches controlled by a first control signal enables/disables a signal path between a BF module and an IF radio, the first switch being in between (i) the BF module and (ii) one of the IF radios or one of the other IF radios operating according to the first wireless protocol set, and wherein a second switch from the second plurality of switches controlled by a second control signal enables/disables a signal path between the IF radio and a front end, and being in between the IF radio and one of the front ends operating according to the second wireless protocol set.

13. The system of claim 11, wherein the baseband processing unit and the other baseband processing unit communicate their data for joint processing by higher layer protocols, thereby supporting the wireless protocol and the first wireless protocol set simultaneously, or supporting carrier aggregation of license and unlicensed frequency bands.

14. The system of claim 11, further comprising a housing that houses the first plurality of switches, the other plurality of IF radios, the other baseband processing unit, the plurality of front ends, the second plurality of switches, or a combination thereof.

15. The system of claim 11, wherein the system is included in a user equipment device.

16. The system of claim 1, wherein said beamforming module is integrated on one or more substrate layers or printed circuit boards, and separated from intermediate frequency radios and baseband processing unit.

17. The system of claim 1, wherein said beamforming modules support time division duplex communication or/and/or frequency division duplex communication.

18. The system of claim 1, wherein the baseband processing unit, the plurality of BF modules, and the plurality of IF radios are combined into a single functional group or separated into a plurality of functional groups.

19. The system of claim 1, wherein the system communicates with a base station having one or more base station units, wherein at least one BF module forms one or more beams aligned with one or more beams generated by the one or more base station units, and high performance links established between the one or more beams of the at least one BF module and the one or more beams of the one or more base station units represent one or more carrier frequencies or one or more data streams.

20. The system of claim 1, further comprising a housing that houses the baseband processing unit, the plurality of BF modules, the plurality of IF radios, or a combination thereof.

21. The system of claim 1, wherein the system is included in a user equipment device.

22. A method of data communication using a distributed phased array multiple input multiple output (DPA-MIMO) system having a plurality of distributed beamforming (BF) modules, a plurality of intermediate frequency (IF) radios, and a baseband processing unit, the method comprising:
- receiving one or more reference signals on said distributed BF modules from a communicating station outside the DPA-MIMO wireless communication system;
- performing beam sweeping and channel estimation by said distributed BF modules, said intermediate frequency (IF) radios and said baseband processing unit;
- determining whether a BF module is blocked or not based on results of the abeam sweeping and channel estimation step, and performing blockage detection for every BF module by said baseband processing unit;
- for one or more BF modules detected as blocked, powering down said blocked BF modules or entering said blocked BF modules into a stand-by state until a time interval having passed and the one or more reference signals is received on said blocked BF modules;
- for one or more BF modules detected as unblocked, performing beam steering and beam alignment, using the unblocked BF modules, with beams from the communicating station to optimize communication link performance including signal strength, power usage, and transmission data rate;
- performing baseband digital beamforming by said baseband processing unit to further optimize communication link performance; and
- transmitting and receiving wireless data signals on configured beams from the unblocked BF modules, the IF radios and the baseband processing unit.

23. The method of claim 22, wherein said distributed BF modules form independently or jointly one or more beams pointing to any directions with any beamwidths and gains to align with the beams from one or more base stations or one or more base station units, and said one or more beams represent one or more carrier frequencies or one or more data streams.

24. A method of data communication using a multiplexed distributed phased array multiple input multiple output (DPA-MIMO) system having one or more beamforming (BF) modules, intermediate frequency (IF) radios, and a baseband processing unit, the method comprising:
- performing spectrum sensing on the one or more BF modules to determine available frequencies, and traffic controlled by the baseband processing unit through signaling path enabled by the intermediate frequency (IF) radios;
- determining network/protocol availability on every BF module;
- examining application requirement to determine needed resources;
- selecting one or more networks/protocols that collectively fulfill application requirements including quality of service for communication;
- configuring and initializing different BF module and IF radio combinations for a choice of one or more wireless networks/protocols; and
- transmitting and receiving wireless data on the DPA-MIMO system.

* * * * *